Sept. 22, 1936.  W. L. SHIVELY  2,055,368
TREATMENT OF GAS
Filed Aug. 19, 1931  3 Sheets-Sheet 1
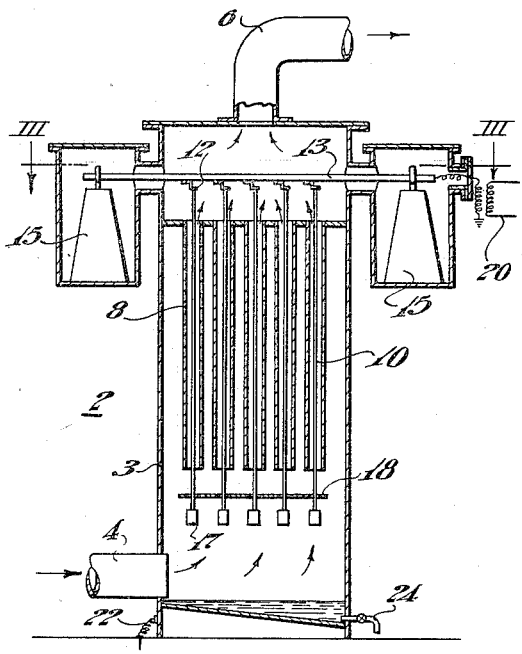
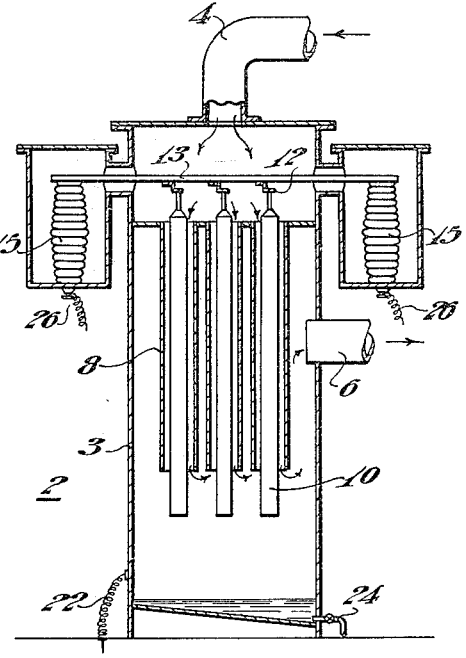
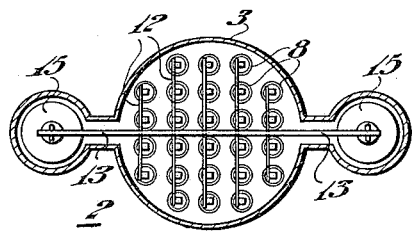
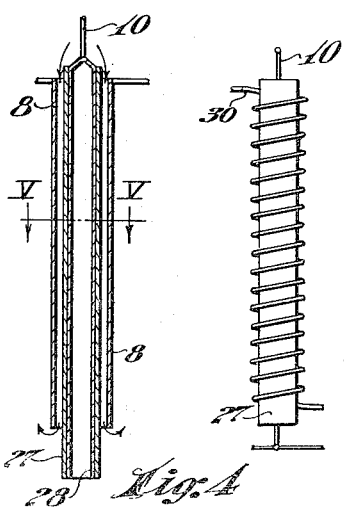
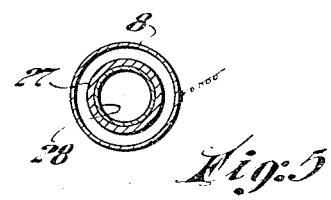
INVENTOR.
Walter L. Shively.
BY Jesse R. Langley
ATTORNEY.

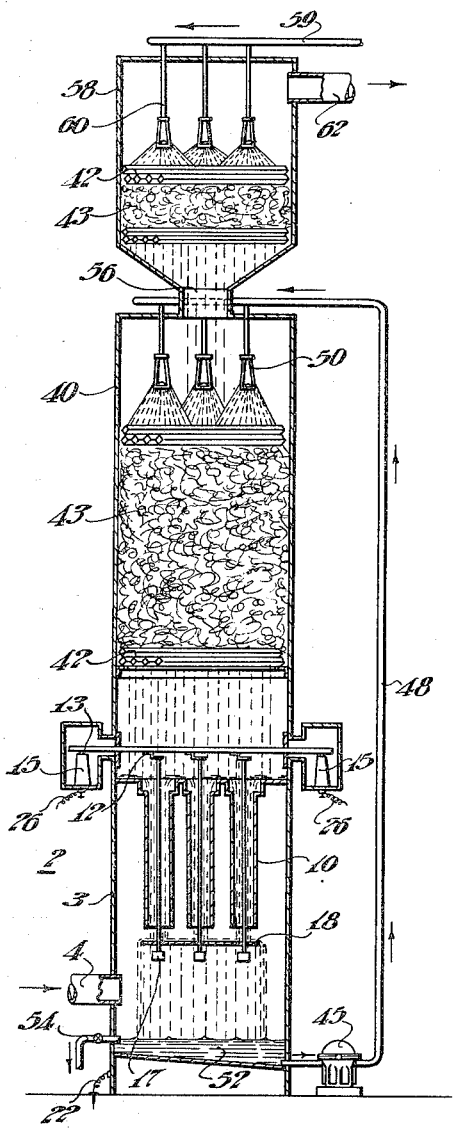
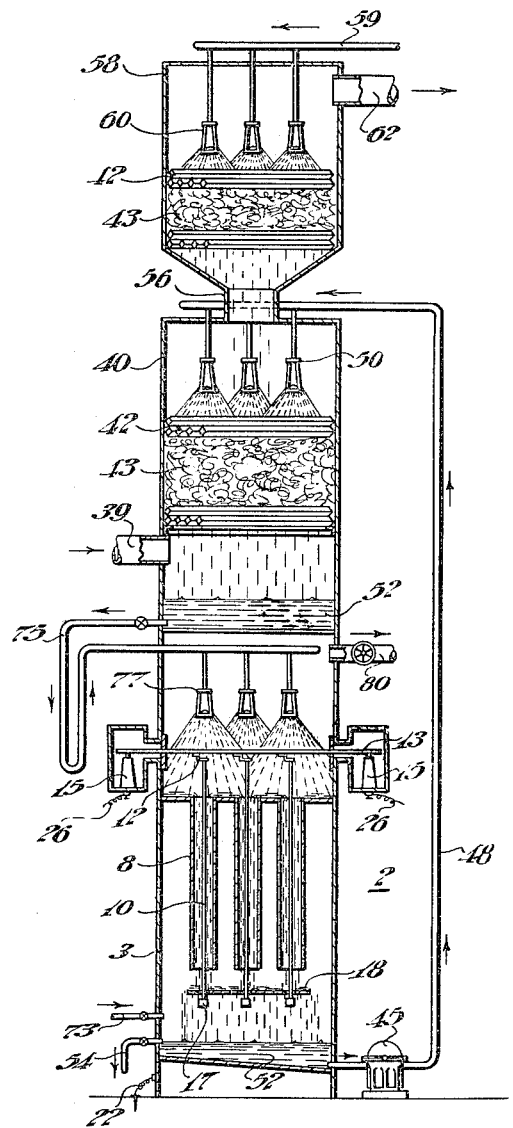
Fig. 8
Fig. 9
INVENTOR.
Walter L. Shively.
BY
Jesse R. Langley
ATTORNEY.

Patented Sept. 22, 1936

2,055,368

UNITED STATES PATENT OFFICE 2,055,368

TREATMENT OF GAS

Walter L. Shively, East Orange, N. J., assignor to The Koppers Company of Delaware, a corporation of Delaware Application August 19, 1931, Serial No. 557,994

6 Claims. (Cl. 204—31)

This invention relates to the treatment of gases to effect the removal of gum-forming constituents therefrom, and it relates especially to the conversion of gum-forming compounds occurring in fuel gases into compounds of higher molecular weight and lower vapor pressure by treatment with the silent, glow, corona, or brush electric discharge.

An object of my invention is to provide an improved process of treating fuel gases, such as coke oven gas, water gas, mixed gas and the like to prevent the deposition of gum or resin therefrom in gas distributing systems and appliances through which the gas passes.

A second object of my invention is to provide a process of treating fuel gases whereby gum-forming compounds occurring in the gases are converted into relatively harmless compounds under the influence of an ionizing electric discharge, and suitable apparatus therefor.

Another object of my invention is to provide an improved process of removing gum-forming compounds from fuel gas and the like, and suitable apparatus therefor.

My invention has for further objects such other advantages and results as are found to obtain in the methods and apparatus described and claimed herewith.

The troublesome nature and characteristics of gum- or resin-forming constituents of coke oven gas and other gases is now generally recognized. These gum-formers occur in the gas as gases or vapors which are not, as such, harmful or undesirable. It is believed that they are generally highly unsaturated compounds, such as the conjugated straight chain and cyclic di- and even tri-olefines, of which butadiene and cyclopentadiene are examples. Certain other compounds, such as indene and styrene, are also known to be troublesome under some circumstances.

These gum-forming compounds, being highly unsaturated, are very active chemically and they have a marked tendency to combine spontaneously with other constituents of the gas and/or to polymerize into compounds of higher molecular weight. Such tendencies make the gum-formers undesirable as constituents of gas which is to be utilized as industrial or domestic fuel or for analogous purposes.

It has been found, for example, that under suitable conditions the gum-formers spontaneously combine with part of the oxygen which may be present in coke oven gas and the like to form compounds of higher molecular weight and lower vapor pressure. This change results in the formation of a fine smoke or mist of sticky varnish-like particles of the reaction product suspended in the gas, and similar suspensoids may also be formed by polymerization or condensation of the gum-formers.

These suspensoids are characterized by extremely small particle size and great permanence. They are therefore carried by the gas stream to very remote parts of the gas distributing system.

The oxidation and/or polymerization of the gum-formers in the gas stream is normally a comparatively slow but progressive reaction and is favored by high pressure, high oxygen content of the gas, low moisture content, and other factors such as temperature and oil content of the gas. The time factor is also important.

It therefore frequently happens that gas which is free from suspensoids of the type described when leaving the manufacturing plant will be found to contain appreciable quantities of the sticky smoke or mist at points farther out in the transmitting and distributing system, especially when transmission is accomplished at pressures substantially above atmospheric.

Very small quantities of the gummy suspensoid, which will be referred to as gum hereinbelow, are sufficient to enable the gas to deposit sticky material on surfaces against which it impinges when subjected to wire-drawing or a sudden change of direction, however, and these deposits build up in pilot flame orifices, valves, governors, thermostatic controls, and the like, to cause stoppages and otherwise to seriously interfere with the efficient functioning of such appliances.

I have found that if gas containing gum-forming constituents is suitably subjected to any form of electrical discharge that will strongly ionize the gas, such as the corona, glow, or brush discharge, its gum-forming tendency is destroyed, and that gas so treated does not show any gum formation during its subsequent transmission and distribution. In most instances, the brush discharge is the most effective form of ionizing discharge for the purposes of the present invention.

Any convenient method of exposing the gas to the ionizing discharge may be employed. For example, on a laboratory scale, I have found that suitable apparatus was prepared from a three-foot length of glass tubing about 1⅝ inches in diameter. The outside of the glass tube was wrapped with copper screen wire to form one electrode, and the other electrode consisted of a fine wire placed axially within the tube. The discharge was produced by maintaining a high difference in electrical potential between these two electrodes.

Under such conditions a blue glow or haze (the corona) is seen to appear within the tube when the apparatus is observed in a dim light. When the voltage is increased a brush discharge, accompanied by a characteristic "fry" or "crackle" is observed. The voltages required for my process depend, of course, upon the size of the apparatus, pressure of the gas treated, etc. I have found that in laboratory size apparatus of the type described, 5,000 volts may be adequate while in full scale installations I may use any voltage up to the flash-over or arcing potential for the particular installation. For example, approximately 60,000 volts is usually satisfactory for a tube six inches in diameter with a small coaxial discharge electrode.

The potential difference required may be produced by a static machine, an induction coil, a high voltage alternating current generator or transformer, or some suitable source of high voltage direct current, such as a battery of cells or a suitable rectifier operating on high potential alternating current.

A convenient form of apparatus for use in the practice of my invention would consist of a modification of an electrical precipitator of the well known Cottrell type, for example, such as is used in the gas industry for the removal of tar fog from gas. It is to be expressly understood, however, that my process is only incidentally concerned with the precipitation of suspended material carried by the gas stream.

The gum-formers enter the apparatus used to produce the electrical discharge, such as a modified tar precipitator, not as suspensoids but as gases or vapors. Under the influence of the discharge these gases or vapors are oxidized, polymerized, or otherwise converted to materials of such high molecular weight and low vapor pressure that they tend to precipitate from the gas stream in the form of the mists or suspensoids previously described. My process is therefore primarily concerned with the conversion of these gaseous and very volatile compounds into substances having vapor pressures so much lower that they cannot readily remain in the gaseous state, but tend to be thrown out or precipitated in the form of the gummy suspensoid.

It is to be understood that the word "polymerize" and its derivatives are used hereinbelow to denote polymerization in the strict technical sense and also other reactions, such as oxidation, condensation, or hydrogenation, by which the gaseous gum-formers are converted to relatively stable or harmless compounds having higher molecular weights and lower vapor pressures.

Since my present invention is concerned with conversion of the gum-formers into more stable and less reactive compounds, if I were to employ existing commercial equipment for my process rather than to construct apparatus especially designed for the purpose, I would prefer to employ an ozonizer rather an electrical precipitator to effect the desired conversion.

I have found that the construction and electrical characteristics of devices which favor ozone formation in oxygen also favor the efficient operation of my process, and in applying my process I prefer to subject gas to the influence of an electrical discharge of the type that induces chemical reaction rather than precipitation. One type of ozonizer can be prepared by the interposition of a di-electric, such as a glass tube, for example, between the terminals of an electric discharge device of the precipitator type.

When the gum-formers have been converted to suspensoids under the influence of the electrical discharge according to the process of my present invention, I may remove them from the gas in any suitable manner. For example, I may locate my apparatus just ahead of the oxide boxes which are commonly used to remove $H_2S$ from manufactured gas and depend upon the passage of the gas through the beds of oxide to free it from the suspended particles, or I may remove the suspensoid by scrubbing the treated gas with oil, or by other suitable procedure.

Furthermore, if I employ an apparatus similar to the electrical tar precipitator and use a unidirectional source of potential to produce the glow discharge, the suspensoids thereby formed may at the same time be more or less completely precipitated by the electrostatic field in a manner similar to the precipitation occurring when such apparatus is operated to remove tar fog or the like from gases. The precipitation of such suspensoids is described in a copending application of A. R. Powell, Serial No. 555,216, filed August 5, 1931.

If the discharge is produced by application of high potential alternating current, the fine gummy suspensoids which form from the gum-forming vapor phase constituents of the gas may agglomerate to particles of relatively large size which easily settle from the gas, or which may even migrate to the electrode and be caught there, or which are otherwise readily removed, as by oil scrubbing.

It is not possible accurately to define the reaction or reactions occurring in my process due to the extremely low concentrations of gum-forming constituents in the gas and the complexity of the resulting materials or gums. It may be that oxygen in the gas (oxygen being present in coke oven gas, for example, between the limits of about 0.2% and 1%) is partially or completely converted to ozone by the action of the glow discharge and that the ozone so produced acts as a powerful oxidizing agent on the gum-formers, converting them to the compounds described hereinabove.

It is also known that a brush discharge or the like will in itself cause the condensation or polymerization of certain organic compounds when they are subjected to its influence in the vapor phase. Such polymerization is particularly easy to bring about in the case of unsaturated compounds, and it is compounds of this class to which the present process is particularly applied. One explanation of the polymerization of gaseous organic compounds under the influence of an ionizing discharge is based on the theory that "ion clustering" occurs.

I have found that the conversion of the gaseous or vapor phase gum-forming constituents of fuel gas into a mist of solid or liquid bodies by the action of a suitable electric discharge is progressive, and that for their full and complete elimination from such a gas a somewhat extended treatment may be required. The conversion and removal of gum-formers may be accelerated by adding to the gas being treated small amounts, such as 0.1 to 1%, for example, of gaseous halogens, such as chlorine, bromine, and fluorine, as described in the co-pending application of G. A. Bragg, Ser. No. 572,449, filed October 31, 1931.

I have also discovered that after partial or complete polymerization of gum-forming constituents of the gas by my process I may scrub the gum and/or gum-formers from the gas with relatively small volumes of fresh oil, whereas rather large volumes of oil are required for washing the gum-formers from the gas when in their original state. This is direct proof of their conversion under the influence of the electrical discharge to compounds of higher molecular weight and lower vapor pressure.

In the foregoing discussion I have described my process with particular reference to its application to the direct treatment of gas containing gum-forming constituents, but it is not my intention to limit my invention to this particular embodiment since the broad principle may be variously applied, as will be described in detail hereinbelow.

For example, the gas which is to be treated for the removal of the gum-forming constituents may be first subjected to the influence of the electrical discharge in suitable apparatus as previously described. This apparatus is of such size and capacity in relation to the gas rate that the gum-formers or gums are not removed from the gas or are only partially removed. The principal action is one of polymerization or the like to the stage where the reaction products still remain in the fuel gas, preferably in the vapor phase. Their vapor pressure, however, is very much lowered so that they may be readily scrubbed from the gas by oil washing in a manner similar to that commonly employed for the removal of naphthalene or light oil.

The oil scrubber in this instance may be of any suitable type, such as a scrubber of the type employed for the removal of light oil or naphthalene, for example, and its oil circulation system is independent of the glow discharge apparatus. In this particular aspect, my present invention may be considered as a modification of the process described in the copending application Serial No. 551,778, filed July 18, 1931, by D. D. Huffman and myself.

I have found that it is possible to more fully utilize the polymerizing action of the electrical discharge in a modification of the process just described. In this modification the gas is passed through a suitable glow discharge device and then through an oil scrubber which is preferably of the two-stage type frequently employed for naphthalene removal, as in the previous instance. The oil from the recirculating section of the scrubber after removing the partially polymerized gum-formers from the gas is passed through the tubes of the discharge device with the gas and then returned to the scrubber.

By this modification many valuable results are obtained. For example, the glow discharge acts on the dissolved gum-formers, which may be already partially polymerized, and completes their conversion to harmless compounds of higher molecular weight, thereby regenerating the oil so that its vapor pressure with respect to gum-formers is practically zero. Ozone formed by the action of the glow discharge on oxygen in the fuel gas is dissolved by the oil and reacts with the dissolved gum-formers to assist in their polymerization or oxidation.

Furthermore, the flushing and solvent action of the oil removes any deposits from the electrodes and keeps them clean and efficient. Also, the interposition of a di-electric, in the form of the oil film, between the electrodes makes possible the use of higher potentials without arcing so that a heavier glow discharge may be obtained.

Thus in a cyclic and continuous manner the gum-formers are at least partially polymerized and then scrubbed from the gas, and the scrubbing oil is regenerated for the absorption of a further quantity of gum-formers.

In another modification of my process the gas may be passed directly into an oil scrubber of suitable type without previous treatment in the glow discharge apparatus, and the scrubbing is then practiced in such manner that unpolymerized gum-formers are substantially completely removed from the gas. The contaminated scrubbing oil is then passed through the glow discharge apparatus as in the previous instance, and the dissolved gum-formers are polymerized under the influence of the discharge, resulting in regeneration of the oil as in the previous instance. In this aspect, my present invention may be considered a modification of the process described in the copending application Serial No. 482,990, filed September 19, 1930, by D. L. Jacobson and myself.

If desired, the glow discharge apparatus employed to regenerate the oil may contain an atmosphere of an oxidizing gas or a gaseous halogen to accelerate the reaction. When the oil treater is filled with oxygen, for example, ozone is formed by the glow discharge and dissolves in the oil to oxidize the dissolved gum-formers and accelerate their conversion into relatively harmless compounds, thus regenerating the oil more rapidly for further absorption of gum-formers.

I may also operate the oil treater at very low pressures, if desired, so that the glow discharge is obtained at substantially lower voltages. In this modification the absolute pressure on the treating device may be only a few millimeters of mercury so that the electrical discharge will be of the type observed in the Geissler tube. This arrangement results in the production of a very voluminous discharge at substantially reduced voltages.

The foregoing examples are illustrative of the many modifications which may be made in my invention without departing from its scope.

I will now describe with reference to the accompanying drawings a preferred method of and apparatus for practicing my improved process of treating gas to prevent the deposition of gums or resins therefrom during distribution. In the drawings, Figure 1 illustrates in vertical section one form of apparatus which may suitably be employed in treating gas and/or oil with the silent electric discharge according to the process of my present invention;

Fig. 2 is a similar view of another type of apparatus for the same purpose;

Fig. 3 is a horizontal sectional view of the apparatus illustrated in Fig. 1 and taken on line III—III thereof;

Figs. 4 and 5 are views in vertical and transverse section, respectively, and show in more detial one arrangement of electrodes for use in electrical treaters, ionizers, and the like;

Fig. 6 illustrates another type of electrode;

Figs. 8 and 9 illustrate modifications of apparatus for this purpose.

Similar numerals are used to designate similar parts in all of the drawings.

Fig. 1 illustrates an electrical precipitator of a more or less conventional type, designated generally by the numeral 2, which may be operated in a manner to subject the gas containing gum-forming constituents to the influence of a strongly ionizing electrical discharge. This might be conveniently achieved by reversing the customary negative potential of the center electrode, making it positive.

Figure 7:
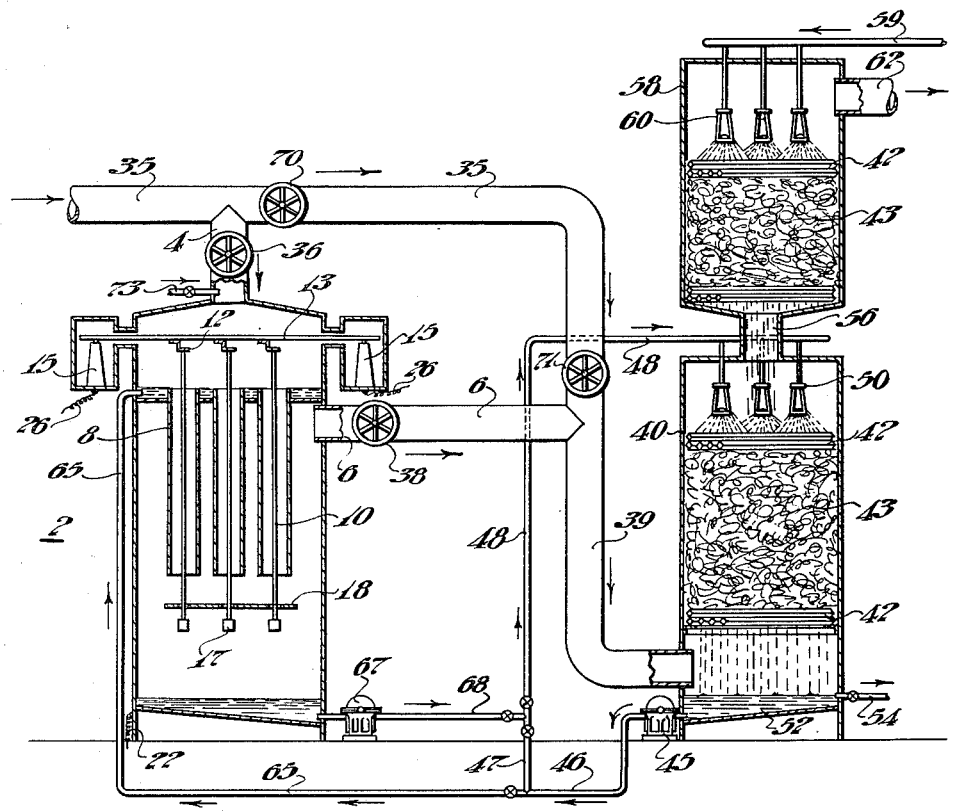
Fig. 7 is an elevational view, with parts broken away, of apparatus suitably employed in my process.

This apparatus consists of a closed shell 3 to which gas is admitted through a pipe 4 and from which gas passes through a pipe 6. The shell contains a plurality of tubes 8 through which the gas passes, and which in usual operation of the apparatus for the removal of tar mist or the like serve as collecting electrodes.

Passing axially through each tube 8 is a discharge electrode 10 which may be a wire, rod, chain, or in any other suitable form. An especially desirable form of discharge electrode is described in a copending application, Serial No. 44,258, filed October 9, 1935, by myself and Earl V. Harlow. These rods are suspended from bars or brackets 12 connected to a bus bar 13 which in turn is supported on insulators 15 in non-conducting relation with the shell 3. The discharge electrodes 10 are held in position by weights 17 and/or a perforated grate or plate 18.

A high potential is applied to the bus bar 13 and the electrodes 10 connected thereto by a rectifier, generator, transformer or the like, indicated diagrammatically at 20. The shell 3 is usually grounded, as by a wire 22 and a stake or the like. The potential difference between the discharge electrodes 10 and the tubes or collecting electrodes 8 is such that an ionizing electrical discharge takes place between them.

Under the influence of this discharge, gum-formers contained in the gas passing through the tubes are at least partially polymerized as described hereinabove. They may also in some instances be precipitated, at least in part, as previously stated. In most cases, however, no condensate will be formed except that any entrained solid or liquid particles carried by the gas will be precipitated as in the usual operation of devices of this type. Any condensate which does form may collect near the bottom of the shell 3 in a sump or the like from which it is withdrawn through a pipe 24.

The device shown in Fig. 2 is similar in construction to the apparatus just described. Gas enters through a pipe 4, passes through the tubes 8 and leaves through pipe 6 as in the previous case. The discharge electrodes 10 are of different form, however, more closely resembling a type sometimes employed in ozonizers and which is illustrated in more detail in Fig. 4. They are connected to a bus bar 13 supported on the insulators 15, and a source of suitably high potential can be connected to the bus bar and the electrodes 10 by means of one or both of the terminals 26.

Fig. 3 shows a cross sectional view along the line III—III of Fig. 1. The relative location of the bus bar 13, the insulators 15, the supporting rods or brackets 12, and the tubes 8 is shown more clearly in this view.

An arrangement of electrodes suitable for use in apparatus of the ozonizer type, or in the apparatus shown in Fig. 2, is illustrated in Fig. 4. The external or collecting electrode consists of a tube 8, which may be made of aluminum, copper, iron, or other suitable conductor. The internal electrode or discharge electrode may suitably consist of a glass tube 27 in the interior of which a tube or plate of copper or other suitable conducting material is placed, as indicated at 28. The glass serves as a di-electric and makes it possible to employ a higher potential difference (with resultant increase in efficiency) between the electrodes without causing arcing. Gas to be treated passes in either direction through the annular space between the two electrodes.

Fig. 5 is a cross sectional view of electrodes of this type, along the line V—V of Fig. 4.

Fig. 6 shows another arrangement of electrodes which may be employed in ozonizers or in treating gas according to my present invention. The external electrode in this case consists of a glass tube 27 around which a wire or strip 30 of copper or the like is wound. Passing axially through the tube is a rod or wire 10 of some suitable conducting material, which is the internal or discharge electrode.

As has been previously stated, the treatment of gas according to my present invention is capable of several modifications. These may be described with reference to Fig. 7. In that figure, gas to be treated flows through a pipe or main 35, and pipe 4 controlled by valve 36, into the precipitator or treating device 2. Gas passes downwardly through the tubes 8 contained in the treater and surrounding the electrodes 10, which are preferably positive, and gum-formers contained in the gas are polymerized under the influence of the flow or brush discharge, as previously described.

The treated gas passes from this apparatus through pipe 6, which is controlled by a valve 38, and then through a pipe 39 into a gas scrubber of any suitable type. In the present instance a two-stage scrubber of the type commonly employed in the removal of naphthalene from fuel gases is shown. Gas to be scrubbed enters a lower section 40 of this scrubber and passes upwardly through contact material, such as wooden hurdles 42 and/or lathe turnings 43 contained therein.

A solvent for polymerized or unploymerized gum-formers is recirculated over this section of the scrubber by a pump 45 through pipes 46, 47, and 48 and sprays or other suitable distributing devices 50, which distribute the solvent over the contact material.

The solvent passes downwardly through this packing in intimate contact with the countercurrently flowing gas and removes partially polymerized and remaining unpolymerized gum-formers therefrom. It then collects in a sump 52 near the bottom of the scrubber, and from there it is recirculated by the pump 45. Excess contaminated solvent is withdrawn through the pipe 54 when necessary.

The partially purified gas passes upwardly from the lower section 40 of the scrubber through a passage 56 into the upper or final section 58 of the scrubber. This section also contains packing material such as wooden hurdles 42 and/or steel lathe turnings 43. Fresh solvent is supplied to this section of the scrubber, preferably intermittently, through a pipe 59 and sprays or other suitable distributing devices 60.

This fresh oil passes downwardly through the upper section 58 of the scrubber, removing any remaining traces of gum or gum-formers from the countercurrently flowing gas, then continues through pipe 56 into the lower section 40, where it is combined with the recirculated oil. Purified gas passes from the upper section of the scrubber through a pipe 62 to storage or to the gas transmitting and distributing system, through which it may pass without causing troublesome deposits of gums and resins.

As an alternative to simple recirculation of the oil in the manner described, part or all of it may be delivered by the pump 45 through pipe 46 into pipe 65, through which it passes into the electrical discharge treater 2. This oil passes downwardly through the tubes 8, concurrently with the gas in the present instance, and dissolved gum-formers removed by the oil from the gas in the scrubber 40 are further polymerized into substantially harmless compounds of relatively low vapor pressure. The treated oil collects near the bottom of the glow treating device, and is withdrawn by a pump 67 and delivered through pipes 68 and 48 to the scrubber 40.

When this modification is employed, the treated oil exerts substantially no vapor pressure with respect to gum-forming constituents and therefore the upper section or fresh oil section 58 of the scrubber may in many instances be omitted.

It is obvious that part of the contaminated oil withdrawn from the sump 52 by the pump 45 may be recirculated directly through the pipes 47 and 48 while the remainder is sent through pipe 65 into the glow treating device, and also that part of the regenerated oil withdrawn from the treating apparatus by pump 67 may be returned directly through pipes 68 and 48 to the scrubber, while another part is being recirculated through pipes 47 and 65 over the treating chamber, with or without a further quantity of contaminated oil from the scrubber.

In a further modification of my process, valves 36 and 38 in pipes 4 and 6 are closed. Valves 70 and 71 in pipe 35 are opened, and the gas to be treated passes directly from pipe 35 through pipe 39 into the lower section 40 of the scrubber, without previous treatment with the glow discharge. In this instance the scrubber is so operated that unpolymerized gum-formers are substantially completely scrubbed from the gas. This generally involves the use of considerably larger quantities of fresh oil than are required when previously treated gas in which the gum-formers are at least partially polymerized is to be scrubbed.

The gas passes through the sections 40 and 58 of the scrubber and is discharged through pipe 62 substantially free from gum-formers as before. Contaminated oil collects in the sump 52 in the bottom of the scrubber and is withdrawn by pump 45 and delivered through pipes 46 and 65 to the glow treating apparatus 2. This apparatus is operated in substantially the same manner as when employed to treat gas, and the treatment polymerizes the gum-formers dissolved in the oil, thereby regenerating the oil as previously described.

The regenerated oil is delivered by pump 67 through pipes 68 and 48 into the lower section 40 of the scrubber as before. Especially when treating oil without simultaneous treatment of gas, but also when gas is being treated, the polymerization of gum-formers contained in the oil and/or gas is accelerated by the introduction of a small quantity of oxygen, a gaseous halogen, or the like, into the treating chamber 2 as described in the aforesaid Bragg application. This may be accomplished by admitting the desired accelerating gas through a pipe 73 from any suitable source.

In many instances, the glow discharge apparatus and a scrubber of suitable type, such as the two-stage scrubber previously described, can efficiently be combined in a single tower. Apparatus in this form has several advantages including the saving of ground space and reduction in pumping costs. Examples of preferred methods of construction in which this improvement is embodied are shown in Figs. 8 and 9.

In Fig. 8, for instance, the scrubbing sections 40 and 58 are placed on top of the electrical treating device 2. Gas to be treated enters the combined tower at 4 and passes upwardly through the tubes 8 wherein it is subjected to the influence of the highly ionizing discharge, as previously described. The gas, in which the gum-formers are at least partially polymerized by the electrical treatment, continues upwardly through contact material such as wooden hurdles 42 and/or lathe turnings 43 contained in the lower scrubbing section 40.

While passing through this contact material the gas is brought into intimate contact with recirculated solvent. This solvent removes at least the major portion of the polymerized or unpolymerized gum-formers contained in the gas and the gas continues upwardly through a passage 56 into the upper scrubbing section 58. In this section it is further purified by scrubbing with substantially fresh solvent supplied through a pipe 59 and sprays 60 onto suitable contact material in this section of the tower. Purified gas passes from the tower through pipe 62 as before.

Fresh oil employed in the upper section 58 continues downwardly through the passage 56 into the lower section 40 where it is combined with the recirculated oil. This combined oil passes downwardly through the contact material 42 and 43 as previously stated, and continues down through the tubes 8 where it is subjected to the influence of the electrical discharge and is thereby regenerated by conversion of dissolved gum-forming compounds into relatively harmless compounds of substantially lower vapor pressures.

The regenerated oil collects at the bottom of the tower and is withdrawn by a pump 45 which delivers it through a pipe 48 and sprays 50 into the scrubbing section 40. Excess scrubbing oil is withdrawn through a pipe 54. Potential is applied to the discharge electrodes through terminals 26, and the tower shell 3 is grounded by a wire 22.

Fig. 9 shows a type of apparatus suitable for use when only the oil is to be subjected to the influence of the glow discharge. Gas to be treated enters a lower scrubbing section 40 through a pipe 39 and passes upwardly through the contact material contained therein in intimate contact with a countercurrent flow of recirculated solvent. Gum-formers contained in the gas are thereby at least partially removed and the gas continues upwardly through passage 56 into the final scrubbing section 58.

Fresh solvent is supplied to this section through a pipe 59 and sprays 60, and completes the removal of gum-formers from the gas. The purified gas passes from the tower through pipe 62. The solvent passes downwardly from section 58 through passage 56 into section 40 as before, and it is there combined with the recirculated solvent. The combined solvent contaminated with gum-formers removed from the gas collects in a sump 52 at the bottom of section 40 and is delivered from that point through a pipe 75 and sprays or other sutiable distributing devices 77 into the interior of the glow discharge chamber.

This solvent then passes downwardly, usually as a film on the inner surface of the tubes 8 surrounding the discharge electrodes 10, and the dissolved gum-formers are polymerized under the influence of the discharge. The oil is thereby regenerated, collects near the bottom of the discharge chamber, and is recirculated by the pump 45 through pipe 48 into the scrubbing section 40.

Gaseous halogens, oxygen, or the like, may be introduced, if desired, through pipe 73 to accelerate the polymerization of gum-formers in the oil. The discharge chamber 2 may be maintained at a pressure substantially below atmospheric, such as an absolute pressure of only a few millimeters of mercury, by means of a vacuum pump (not shown) or other suitable device connected to the discharge chamber through a pipe 80.

If it is desired to treat both the gas and the oil according to the process of my invention but it is not desirable to treat them in the same chamber, it is of course obvious that separate treating chambers could be used for the treatment of gas and oil. It is also to be understood that a vacuum may be maintained in the electrical treatment chamber, and that halogen gases or the like may be introduced therein in any of the foregoing modifications of my process.

The potential which I prefer to apply in any particular instance depends to a large extent on the pressure of the gas treated, the form and polarity of the electrodes, and the diameter of the tubes. In any case, it is essential tnat the voltage be sufficiently high to cause an ionizing electrical discharge between the electrodes.

It will be obvious to those skilled in the art that certain modifications can be made in the several parts of my apparatus and the several steps of my process, in addition to those described hereinabove, without departing from the spirit of my invention, and it is my intention to cover in the claims such modifications as are included within the scope thereof.

I claim as my invention:

1. The process of treating fuel gas containing gum-forming compounds in gaseous phase, which comprises scrubbing the fuel gas with a solvent for gum-formers while in the liquid state and polymerizing gum-forming compounds occurring in the gas and in the spent solvent aforesaid by subjecting the gas and spent solvent in liquid state simultaneously to the influence of the same ionizing electrical discharge.

2. The process of treating fuel gas containing gum-forming compounds, which comprises subjecting said gas to the influence of an ionizing electrical discharge and thereby polymerizing the gum-forming compounds while in the fuel gas, scrubbing the electrically treated gas with an oil which removes gum-forming compounds therefrom and is thereby contaminated, and simultaneously subjecting the contaminated oil while in liquid state and a further quantity of gas to the influence of the same ionizing electrical discharge.

3. A method of preventing the deposition of gum or resin from organic gum-formers in vapor phase in the distribution of fuel gas of such character as coke oven gas containing organic gum-formers as gaseous or vapor phase gum-formers and other constituents which normally tend to combine spontaneously therewith by a comparatively slow but progressive reaction to form gum in the distribution system, which comprises subjecting said gas prior to its entering the distribution system to the influence of an electrical discharge that is a brush discharge, and in such manner and in such relation to the gas rate as substantially to avoid the forming of condensate other than some incidental precipitation of entrained liquid or solid particles carried by the gas as it enters the treatment, and thereby inducing in the gas such chemical reactions as substantially to destroy its aforesaid gum-forming tendency, the reactions being effected to substantially the stage where the reaction products still remain in the gas in gaseous or vapor phase when the gas passes out from the electrical treatment, removing such reaction products from the gas, and then admitting the gas to the distribution system substantially free of gum formation during subsequent transmission and distribution.

4. A method of preventing the deposition of gum or resin from organic gum-formers in vapor phase in the distribution of fuel gas of such character as coke oven gas containing organic gum-formers as gaseous or vapor phase gum-formers and other constituents which normally tend to combine spontaneously therewith by a comparatively slow but progressive reaction to form gum in the distribution system, which comprises subjecting said gas prior to its entering the distribution system to the influence of a highly ionizing electrical discharge, and in such manner and in such relation to the gas rate as substantially to avoid the forming of condensate other than some incidental precipitation of entrained liquid or solid particles carried by the gas as it enters the treatment, and thereby inducing in the gas such chemical reactions as substantially to destroy its aforesaid gum-forming tendency, the reactions being effected to substantially the stage where the reaction products still remain in the gas in gaseous or vapor phase when the gas passes out from the electrical treatment, removing such reaction products from the gas, and then admitting the gas to the distribution system substantially free of gum formation during subsequent transmission and distribution.

5. A method of preventing the deposition of gum from organic gum-formers in vapor phase in the distribution of fuel gas of the character of coal-gas, water gas and the like containing organic gum-formers in gaseous or vapor phase and other constituents which normally tend to combine spontaneously therewith by a comparatively slow but progressive reaction to form gum compounds of higher molecular weight in the distribution system, which comprises subjecting said gas prior to its entering the distribution system to an electric discharge of the brush type and so as to induce in the gas a chemical reaction effecting conversion of constituents whose reaction promotes formation of readily precipitated gummy suspensoid from the vapor-phase organic gum-formers, then scrubbing the so treated gas to further the elimination of the converted constituents, and then admitting the gas to the distribution system substantially free of gum formation during subsequent transmission and distribution.

6. A method of preventing the deposition of gum from organic gum-formers in vapor phase in the distribution of fuel gas of the character of coal-gas, water gas and the like containing organic gum-formers in gaseous or vapor phase and other constituents which normally tend to combine spontaneously therewith by a comparatively slow but progressive reaction to form gum compounds of higher molecular weight and low vapor pressure in the distribution system, which comprises subjecting said gas prior to its entering the distribution system to an electric discharge of the character of the brush type and so as to induce in the gas a chemical reaction that converts the gum-formers to materials of such higher molecular weight and low vapor pressure that they tend to precipitate from the gaseous state, scrubbing the gas to remove such converted materials, and then admitting the gas to the distribution system substantially free of gum formation during subsequent transmission and distribution.

WALTER